United States Patent [19]
Yamazaki

[11] Patent Number: 4,853,911
[45] Date of Patent: Aug. 1, 1989

[54] OPTICAL DISC MEMORY SYSTEM UTILIZING A SMECTIC CHIRAL LIQUID CRYSTAL

[75] Inventor: Shunpei Yamazaki, Tokyo, Japan

[73] Assignee: Semiconductor Energy Laboratory Co., Ltd., Kanagawa, Japan

[21] Appl. No.: 874,102

[22] Filed: Jun. 13, 1986

[51] Int. Cl.[4] .................. G11B 11/14; G11C 13/04
[52] U.S. Cl. .................... 369/13; 369/110; 365/108; 365/117
[58] Field of Search .............. 350/351, 350 S, 334, 350/335, 349, 340, 341, 330; 365/108, 117; 369/13, 110, 111, 100; 360/114, 59

[56] References Cited

U.S. PATENT DOCUMENTS

| | | | |
|---|---|---|---|
| 3,988,056 | 10/1976 | Hareng et al. | 350/351 |
| 4,048,628 | 9/1977 | Boswell | 365/108 |
| 4,367,924 | 1/1983 | Clark et al. | 350/341 |
| 4,405,993 | 9/1983 | Kahn et al. | 365/108 |
| 4,472,026 | 9/1984 | Boyd et al. | 350/341 |
| 4,563,056 | 1/1986 | Clark et al. | 350/341 |
| 4,586,791 | 5/1986 | Isogai et al. | 350/341 |
| 4,606,613 | 8/1986 | Urabe | 350/351 |
| 4,634,226 | 1/1987 | Isogai et al. | 350/350 S |
| 4,634,228 | 1/1987 | Iwasaki et al. | 350/350 S |
| 4,752,820 | 6/1988 | Kuroiwa et al. | 346/135.1 |

FOREIGN PATENT DOCUMENTS

| | | |
|---|---|---|
| 32362 | 7/1981 | European Pat. Off. . |
| 91661 | 10/1983 | European Pat. Off. . |
| 127140 | 12/1984 | European Pat. Off. . |
| 60-130187 | 6/1960 | Japan . |
| 1594489 | 7/1981 | United Kingdom . |
| 2090673 | 7/1982 | United Kingdom . |

OTHER PUBLICATIONS

Mol. Cryst. Liq. Cryst., vol. 94, 1983, N. A. Clark et al., "Ferroelectric Liquid Crystal Electro-Optics Using the Surface Stabilized Structure", pp. 213-234.
H. Birecki et al., "Erasable Optical Liquid Crystal Disc Memory", SPIE, 420, 194 (1983).

Primary Examiner—Alan Faber
Assistant Examiner—Hoa T. Nguyen
Attorney, Agent, or Firm—Gerald J. Ferguson, Jr.

[57] ABSTRACT

An improved magneto-optical disc memory recording and reading system with a ferroelectric liquid crystal (FLC) is shown. As FLC a chiral smectic liquid crystal is employed to exhibit a bistability between a pair of substrates which have easy polarization axes normal to each other. Informations to be recorded are written on the disc in terms of a binary system by use of the bistability.

4 Claims, 4 Drawing Sheets

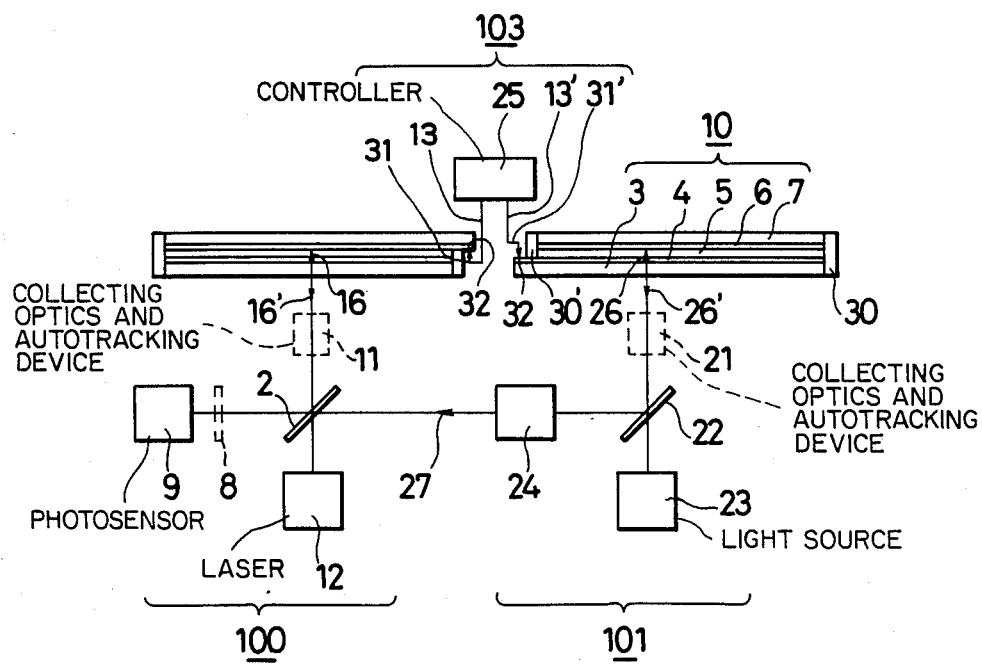

OPTICAL DISC MEMORY SYSTEM UTILIZING A SMECTIC CHIRAL LIQUID CRYSTAL

BACKGROUND OF THE INVENTION

1. Field of the Invention

This invention relates to an optical disc memory which employs a liquid crystal made of optical molecules, possessing an electric dipole density.

2. Brief Description of Prior Art

As an optical disc device there is known a nonrewritable digital disc memory divice that utilizes the reflecting conditions of laser light from an uneven reflecting surface, as represented by the compact disc. This application is being considered that will become very promising in the future not only for audio and video uses but also for an optical disc memory for information processing. However, a disadvantages of the disc memory is that it is not possible to be rewritten. For this reason, systems that permit rewriting had been in demand, and as such a product there is known the magneto-optic memory device. In addition, there is also known an optical disc memory device of amorphous semiconductor type that employ a chalcogen series (tellurium series).

However, disc device that employ magneto-optic memory use rare materials and are extremely expensive so that people are apprehensive of their mass production in the future. Moreover, the light control for the method that employs chalcogen series amorphous semiconductor is extremely delicate.

Because of these, there have been sought means that possess such feature as the use of materials that can be mass produced, facility in turning on and off of light, possession of nonvolatility, and nonconsumption of external energy in storing the memory.

SUMMARY OF THE INVENTION

It is therefore an object of the invention to provide an optical disc memory with liquid crystal.

It is another object of the invention to provide an erasable and rewritable optical disc memory.

It is a further object of the invention to provide an optical disc memory with which recording system can be simple and economic.

It is further object of the invention to provide an improved information recording system with high speed erasing and writing operations.

In order to accomplish the above and other objects and advantages, the inventor has employed a liquid crystal which exhibit a stability of molecular attitude in cooperation with means for latching the molecular attitude of the liquid crystal. With the stability of the liquid crystal, the informations to be recorded are written on the disc memory in terms of polarizing power.

BRIEF DESCRIPTION OF THE DRAWINGS

FIG. 1 is a schematic illustration of a first embodiment of an optical disc memory in accordance with the invention.

PREFERRED EMBODIMENTS OF THE INVENTION

Figure 2A:
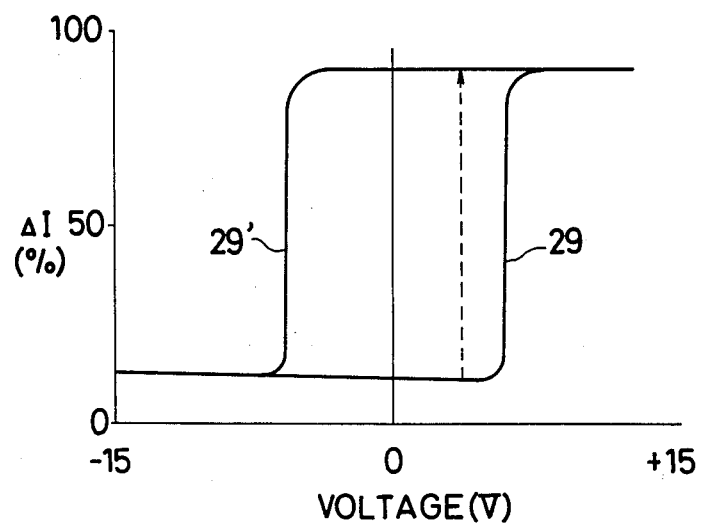
FIGS. 2(A) and 2(B) are light transmissivity versus voltage curves for the optical disc memory of the invention.

Referring to FIG. 1 an embodiment of the invention is shown.

A first system 100 is for "reading" information, a second system 101 is for "writing" information and a third system 103 is for "erasing" information. Reference 10 designates an optical disc.

The optical disc has two disc substrates 3 and 7 opposed to each other. At least one of the substrates, the substrate 3 in the figure, is light transmitting. On the insides of the two, there are provided electrodes 4 and 6 respectively. Here, the electrode 4 provided on the substrate 3 must be light transmitting and the electrode 6 on the substrate 7 must be reflective. Moreover, at least one of the substrates 3 and 7 is formed with the inside surface thereof having an orienting capability, as discussed below. The substrates 3 and 7 are separated from each other by a 4 $\mu$m distance with spacers (not shown). Between the substrates 3 and 7, a ferroelectric liquid crystal (FLC hereafter), such as smectic C*, is disposed. The disposing process is carried out with the hot liquid crystal in a smectic A phase. In so doing, the FLC molecules are aligned and formed into a plurality of molecular layers perpendicular to the substrates at room temperature, according to the oriented inner surface of the substrate, and get a stability.

The inner and outer peripheries of the optical disc are sealed off by sealing members 30 and 30' to shut out FLC from making contact with air. On the inner periphery side of the optical disc 10 there are provided contacts 32 and 32' that are formed extending from a pair of electrode 4 and 6 for applying voltage between the electrodes.

The optical disc will be described in more detail in the following:

Namely, for the substrate 7 use was made of plastic or corning 7059 glass. On this substrate there was formed a reflective electrode 6 of Alminium by vapor deposition in vacuum. The opposing electrode 4 was prepared by forming a light-transmitting conductive film on the transparent substrate 3 of plastic or glass. As the light transmitting conductive film use was made of ITO (indium-tin oxide). Then, on the inside of electrode 4, there are provided orienting film (not shown) of PAN (polyacryl-nitryl) and PVA (polyvinyl-alcohol) by spinning method to a thickness of 0.1$\mu$. FLC 5, e.g. S8 (octyl-oxy-benzylideneamyno-methyle-butyl-benzoate) of thickness 1.5$\mu$, was sandwiched by the electrodes. A number of spacers are interposed between the pair of substrates to reinforce the disc memory.

To the inner surface a known rubbing treatment is given. For example, a cylinder covered with nylon film is rotated in a rubbing device at 900 RPM and the inner surface of the film to be oriented undergoes the treatment of the rubbing device by moving at a speed of 2 m/min. In this embodiment, DOBAMBC or a blending of a plurality of FLCs may also be used as FLC to be filled in the disc instead of S8. Some examples are shown by J. W. Goodby et al., "Ferroelectrics Switching in the Tilted Smectic Phase of R-C-3-4-n-Hexyloxydenzylidene 4'-Am'no-(2-Chloropropyl) (innamate(-HOBACPC))", Ferroelectrics 1984 Vol. 59 pp. 126–136, Japanese patent published applications Nos. sho 59–98051 and 118744.

As an FLC confined in the disc, a chiral smectic C liquid crystal is used. Between the two substrates 3 and 7 FLC has a molecular structure composed of a plurality of laminated layers each perpendicular to the substrates 3 and 7. In each layer the molecules of the liquid crystal tend to be arranged in the same attitude having a ferroelectric polarization P (electric dipole moment) normal to the long axis of the liquid crystal molecule and laying on the layer. The long axes spontaneously make a certain tilt angle with the layer normal. Accordingly, the dipole moments of the molecules will be perpendicular to the substrates 3 and 7.

FIG. 2(A) shows a light transmissivity versus a voltage across the liquid crystal in reference to duly polarized light incident on FLC between the substrates 3 and 7. By means of the contiguous surface of the substrate to FLC, FLC exhibits hysteresis. Namely when +15 V (or $3 \times 10^4$ V/cm) is applied between the electrodes, FLC appears transparent having the electric polarization (referred to as having the "up" dipoles hereinafter). On releasing application of the voltage, the transparency of FLC remains as it was. On the other hand, an application of reverse voltage, e.g. −15, transforms the condition of FLC into an opaque condition having the opposite electric polarization (the "down" dipoles, hereinafter). This opaque condition can be observed even after the applied voltage is increased to a forward voltage providing the forward voltage is less than the coercive voltage Ec.

Figure 2B:
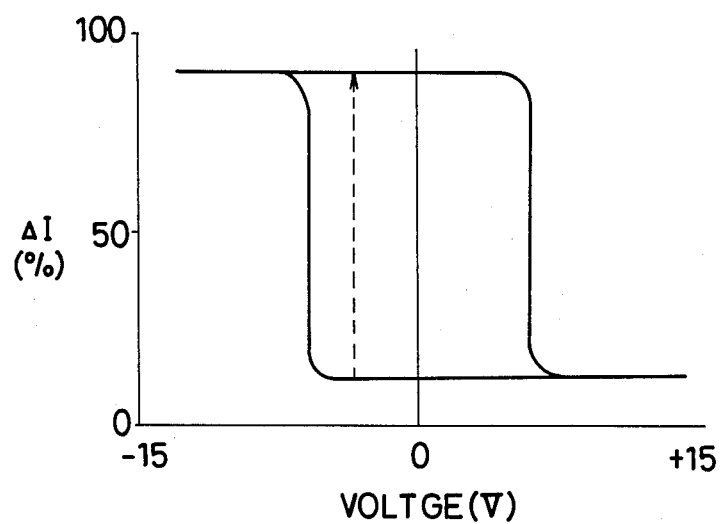

Having increased from −15 v to a certain forward level less than the coersive voltage Ec, the applied voltage becomes to favor the "up" dipole although FLC has yet held the "down" dipoles in virtue of the contiguous surfaces of the substrates. Some suitable external disturbance such as a light beam can inverse the dipoles of the molecules from "down" to "up" as shown in FIG. 2A with a broken line. In this embodiment, some domains of FLC are irradiated with light beam, especially of infrared ray, to be reversed selectively. In the following, the condition with the "up" dipole is referred to as "0" state and the condition with the "down" dipole as "1" state. FIG. 2(B) shows the characteristics of FLC with respect to light incident thereon polarized on the plane of polarization normal to that of FIG. 2(A).

Now the explanation of how information is written on or erased from the above described disc memory is in order.

In erasing system 103 the electrodes of external contacts 32 and 32' are connected to the terminals 31 and 31' of the leads 13 and 13' that are taken out from a high voltage source 25 to carry out "erasing". A sufficient voltage is applied between the opposing electrodes 32 and 32' to arrange FLC molecules in one direction, referred to "0" state, entirely throughout the disc.

With this condition of the disc, "writing" of information will be carried out for the disc by the use of the system 101. Namely, "writing" is carried out by irradiating a prescribed address of FLC whose molecules are arranged in one direction throughout its surface, with a light beam 26 under application of weak voltage less than Vc. If wavelength is 1–3μ, FLC can absorb a large part of the light energy. The appropriate wavelength depends on the applied voltage. For example, 10 V versus 1.2 μm or 6 V versus 2 μm are suitable. In so doing, information is being recorded on the disc in terms of binary system.

The light beam 26 is radiated from a light source 23 through a half-mirror 22 and a system 21 such as a collecting optics and an autotracking device. After being reflected from the disc, the reflected light beam 26' further reaches a photosensor 9 via the mirror 22 and a light intensity controller 24. That writing is in progress is monitored there.

Next reading process will be described. The light beam from a semiconductor laser 12 impinges, after passing through a half-mirror 2 and a system 11 such as a collecting optics and an auto-tracking device, upon the optical disc 10 as a beam 16. Then, the light is reflected from the disc 10 as a beam 16', its path is split by the half-mirror 2, and reaches the light-receiving sensor 9 via a polarizing plate 8.

According to the sense of the liquid crystal on which the light is incident, the reflected light is polarized either on parallel plane or unparallel plane to the plane of polarization of the plate 8. Although, if the tilt angle of the liquid cyrstal is 45°, the light incident on the plate 8 has been polarized on parallel or normal plane to the polarizing plane of the plate 8, the polarization by the liquid crystal is occasionally not satisfactory because the liquid crystal, even with complete regular arrangement of molecules with the same attitude, is necessarily to polarize light wave completely. To enhance the polarizing power of such a liquid crystal, some additive is available so that the molecules of the additive are interposed and oriented between the molecules of the liquid crystal. The additive functions as a polarizer in cooperation with the liquid crystal while the liquid crystal determines the sense of attitude to be taken by molecules of itself and the additive. For example, as an additive, dichromatic substance such as anthraquinone dye or azo-compound are effective. The polarizing power is attributed to an absorption anisotropy.

Figure 3:
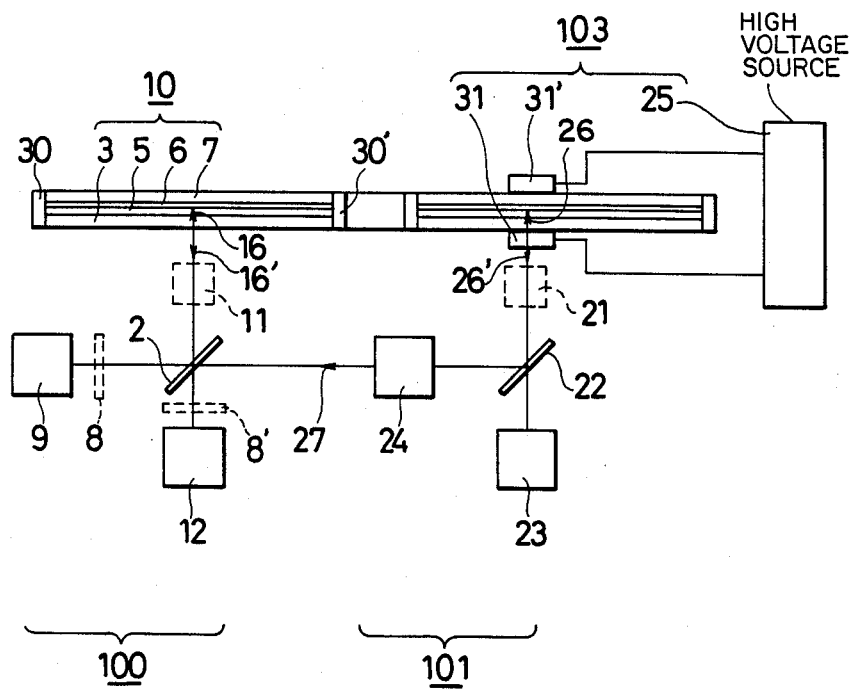
FIG. 3 is a schematic illustration of a further embodiment of the invention.

Another embodiment is shown in FIG. 3. In the figure, the construction is the same as in the foregoing embodiment except for the electric field applying method, therefore redundant explanations are not repeated.

In this case, a voltage is applied, for the optical disc 10, directly to a pair of electrodes 31 and 31' from a high voltage source 25 on the outside, in order to impress a prescribed electric field on FLC. The electrodes 31 and 31' are proximately close to the optical disc 10. Although, in the figure, the electrode 31 and 31' have a length which is only a fraction of the radius of the disc, they may have a length equal to the radius. In the former case, electric power consumption is reduced. In the latter case, dispensed with is a means for radially scanning the disc 10 with the electrodes 31 and 31' from outside toward inside, or vice versa, of the disc 10, and it is possible to erase the entire surface of the disc with one rotation of the disc 10. According to this another embodiment, the optical disc 10 comprises the pair of electrodes 31 and 31', one of which is transmissive and other of which has reflective inside, and FLC between the substrates. In the figure a reflective plate 6 is provided on the glass plate 7. Although the reflective plate 6 must not be conductive, use of conductive plate makes it possible to place the electrode 31' apart from the disc.

Although only a few exemplary embodiments of this invention have been described in detail above, those skilled in the art will readily appreciate that many modifications are possible in the exemplary embodiments without materially departing from the novel teaching and advantages of this invention. For example, a polarizing plate 8' can be placed between the half-mirror 2 and the laser 12 instead of the plate 8. In this modification, the light incident on the disc is polarized in advance in favor of one of the bistate conditions.

What is claimed is:

1. An information recording and reading system comprising:
    an optical disc memory including (a) a pair of substrates provided in parallel with an interval in between, at least one of which is transparent and (b) a chiral smectic liquid crystal layer disposed between said substrates in which liquid crystal molecules are arranged in parallel to the substrates with their dipole moments perpendicular to said substrates, wherein a number of domains are defined in said liquid crystal layer of the optical disc memory;
    means for applying to said liquid crystal layer a strong electric field, the strength of the strong electric field being such as to direct the dipole moments of the liquid crystal molecules uniformly in one direction perpendicular to said substrates, said one direction of the dipole moments remaining after removal of the strong electric field;
    means for subjecting, subsequent to the removal of the strong electric field, at least said particular domains to a weak electric field opposite in direction to said strong electric field, the strength of said weak electric field being such as not to change the directions of the electric dipole moments established by the strong electric field in the absence of said irradiating of the particular domains, the directions of the dipole moments at the particular domains being changed in response to the particular domains being irradiated and the weak electric field being applied thereto to thus write and store information in the optical disc memory; and
    means for reading information stored in said optical disc memory including (a) means for applying light to a polarizing element spaced from the optical disc memory and out of the path of the light utilized by the irradiating means to thus apply polarized light to the optical disc memory and (b) means sensing light which passes through predetermined domains in the liquid crystal layer corresponding to the polarized light to thus read the information stored in the optical disc.

2. The system of claim 1 wherein the strong electric field applying means includes a voltage supply for applying a high voltage to a pair of electrodes which are respectively disposed on the insides of said substrates adjacent all said domains of said optical disc memory.

3. The system of claim 1 where said optical disc memory is rotatable around its center.

4. The system of claim 1 wherein said irradiating means includes a focusing device through which said light is directed to one of said domains.

* * * * *